(12) United States Patent
Thomsen et al.

(10) Patent No.: US 12,146,656 B2
(45) Date of Patent: Nov. 19, 2024

(54) HEAT EXCHANGER WITH PIPE BUNDLE

(71) Applicant: Alfa Laval Aalborg Header-coil Company A/S, Aalborg (DK)

(72) Inventors: Peter Thomsen, Aalborg (DK); Ivan Bo Christensen, Hobro (DK); Jens Taggart Pelle, Vadum (DK); Keld Sørensen, Skørping (DK); Svante Bundgaard, Aalborg (DK)

(73) Assignee: Alfa Laval Aalborg Header-coil Company A/S, Aalborg (DK)

( * ) Notice: Subject to any disclaimer, the term of this patent is extended or adjusted under 35 U.S.C. 154(b) by 425 days.

(21) Appl. No.: 17/618,990

(22) PCT Filed: Jun. 15, 2020

(86) PCT No.: PCT/DK2020/050170
§ 371 (c)(1),
(2) Date: Dec. 14, 2021

(87) PCT Pub. No.: WO2020/253924
PCT Pub. Date: Dec. 24, 2020

(65) Prior Publication Data
US 2022/0325884 A1    Oct. 13, 2022

(30) Foreign Application Priority Data
Jun. 17, 2019  (DK) .............................. PA201970376

(51) Int. Cl.
*F22B 1/00*      (2006.01)
*B01D 45/08*    (2006.01)
(Continued)

(52) U.S. Cl.
CPC .............. *F22B 1/006* (2013.01); *B01D 45/08* (2013.01); *B01D 45/16* (2013.01); *F22B 15/00* (2013.01);
(Continued)

(58) Field of Classification Search
CPC .......... F28D 7/082; F28D 7/087; F28D 7/085; F28D 7/08
See application file for complete search history.

(56) References Cited

U.S. PATENT DOCUMENTS 3,732,922 A * 5/1973 Pouderoux .............. F28D 7/005
165/158
4,136,644 A * 1/1979 Tratz ........................ G21D 5/08
122/382

(Continued)

FOREIGN PATENT DOCUMENTS

CN   86 1 06039 A   5/1987
CN   105580087 A    5/2016
(Continued)

OTHER PUBLICATIONS

International Search Report (2 pages) dated Aug. 20, 2020 from PCT Priority Application No. PCT/DK2020/050170.
(Continued)

*Primary Examiner* — Steven S Anderson, II
*Assistant Examiner* — Kurt J Wolford
(74) *Attorney, Agent, or Firm* — Crowell & Moring LLP; John C. Freeman

(57) ABSTRACT

A heat exchanger including a pipe bundle to guide a fluid between first and second pipe connectors, the pipes being distributed in layers of pipes, wherein pipes of each of the layers of pipes each includes. A length of a flow path section is at least 1.7 times greater than lengths of two other flow path sections, wherein a first bend of the two bends is provided between the longer flow path section and a first of the shorter flow path section, and wherein a second of the two said bends is provided between the first, shorter flow path section and the other shorter flow path section, and wherein each of the layers of pipes includes two pipe subgroups. The bend between the two shorter flow path
(Continued)

Figure 3:
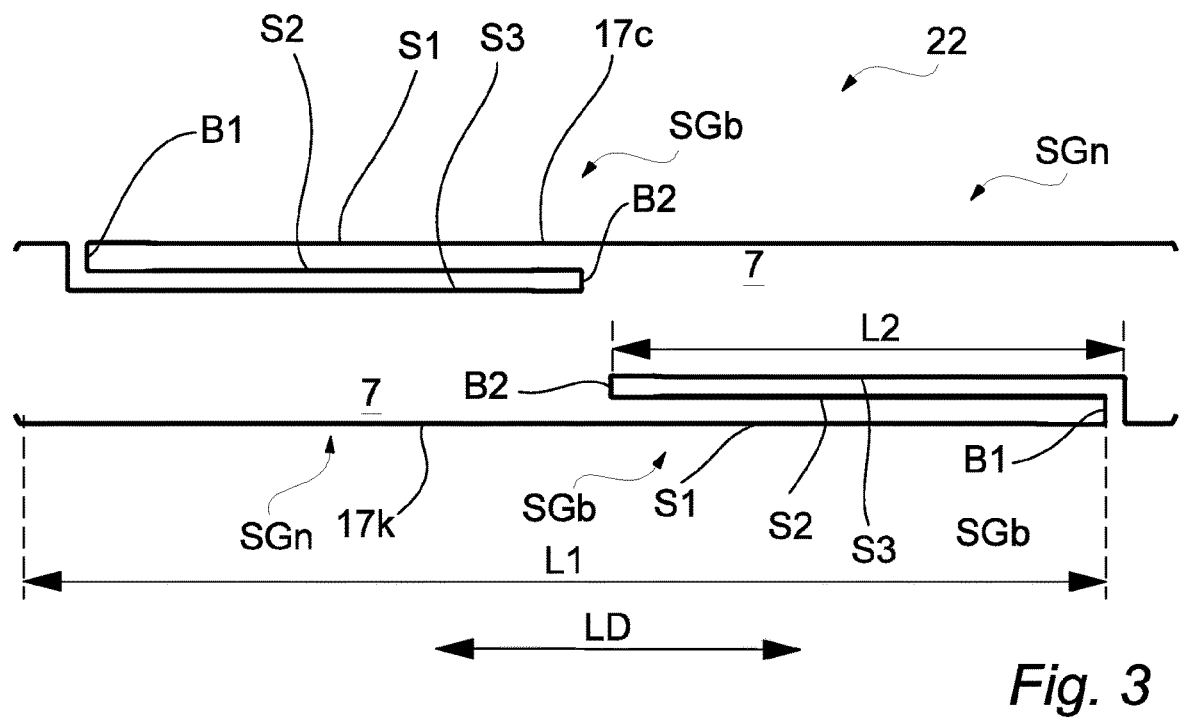

sections of the respective pipes in one of the pipe subgroups in the pipe layer is arranged substantially opposite to bends extending between the two shorter flow path sections of pipes in the other pipe subgroup of the same pipe layer.

25 Claims, 7 Drawing Sheets

(51) Int. Cl.
*B01D 45/16* (2006.01)
*F22B 15/00* (2006.01)
*F28D 7/00* (2006.01)
*F28D 7/08* (2006.01)
*F28D 7/16* (2006.01)
*F28D 21/00* (2006.01)

(52) U.S. Cl.
CPC ........... *F28D 7/0083* (2013.01); *F28D 7/082* (2013.01); *F28D 7/085* (2013.01); *F28D 7/087* (2013.01); *F28D 7/16* (2013.01); *F28D 7/1607* (2013.01); *F28D 2021/0064* (2013.01); *F28F 2210/10* (2013.01)

(56) References Cited

U.S. PATENT DOCUMENTS

| | | |
|---|---|---|
| 4,727,933 A | 3/1988 | Hell et al. |
| 2013/0112156 A1 | 5/2013 | Band et al. |
| 2013/0118419 A1 | 5/2013 | Stahlhut et al. |
| 2014/0027099 A1 | 1/2014 | Sispera et al. |
| 2015/0083365 A1 | 3/2015 | Prabhu et al. |

FOREIGN PATENT DOCUMENTS

| | | |
|---|---|---|
| CN | 106287627 A | 1/2017 |
| EP | 2 278 220 A1 | 1/2011 |
| EP | 2 322 854 B1 | 9/2013 |
| EP | 2 278 220 B1 | 3/2014 |
| GB | 1 520 820 A | 8/1978 |

OTHER PUBLICATIONS

Written Opinion (7 pages) dated Aug. 20, 2020 from PCT Priority Application No. PCT/DK2020/050170.
Office Action (9 pages) dated Jan. 17, 2020 from corresponding Danish Patent Application PA 201970376
Notification of First Office Action (5 pages) dated May 31, 2023 out of related Chinese Patent Application No. 2020800433919.

* cited by examiner

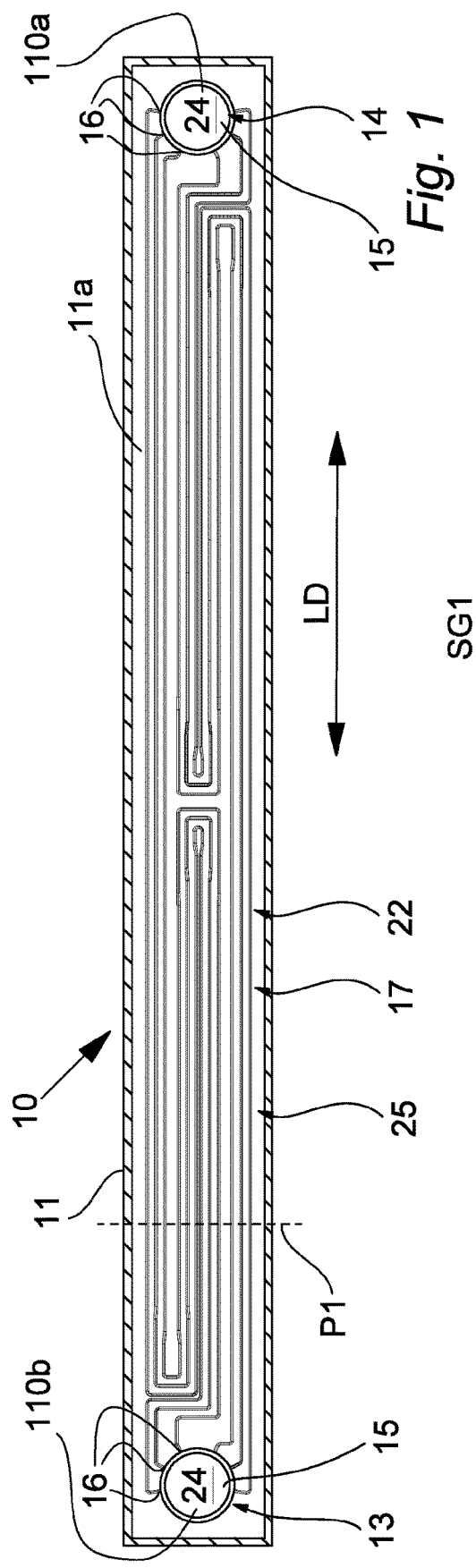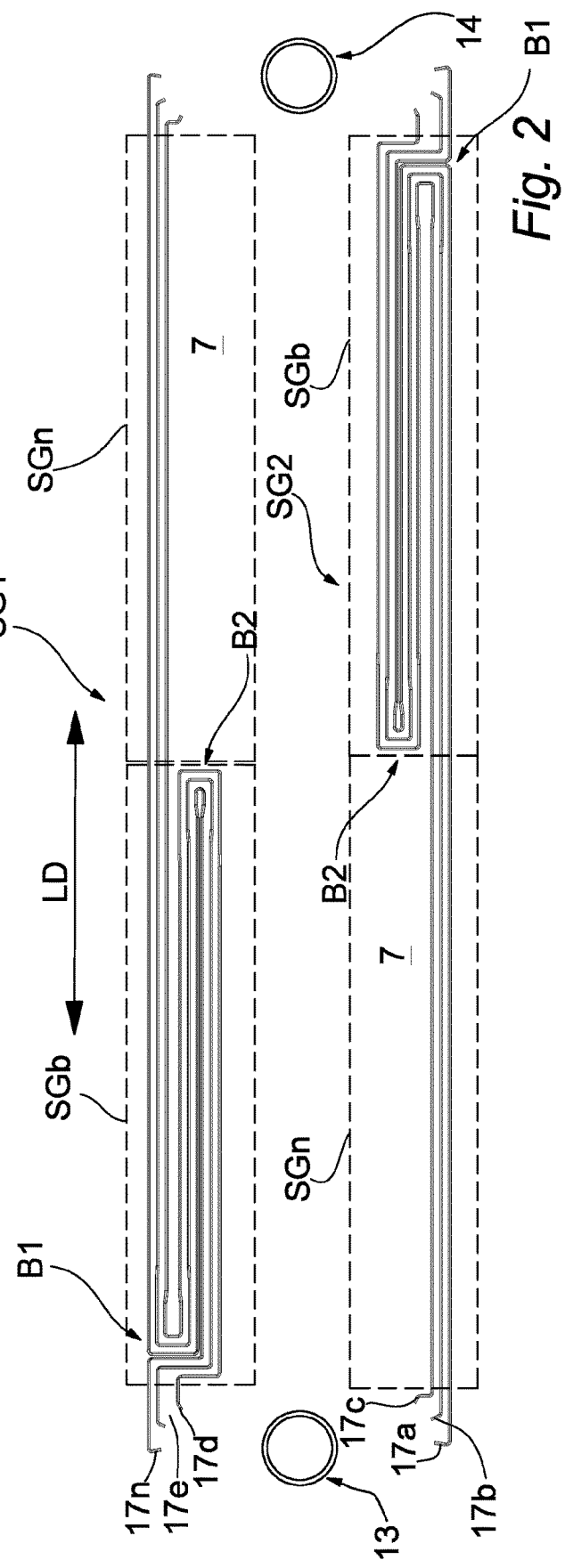

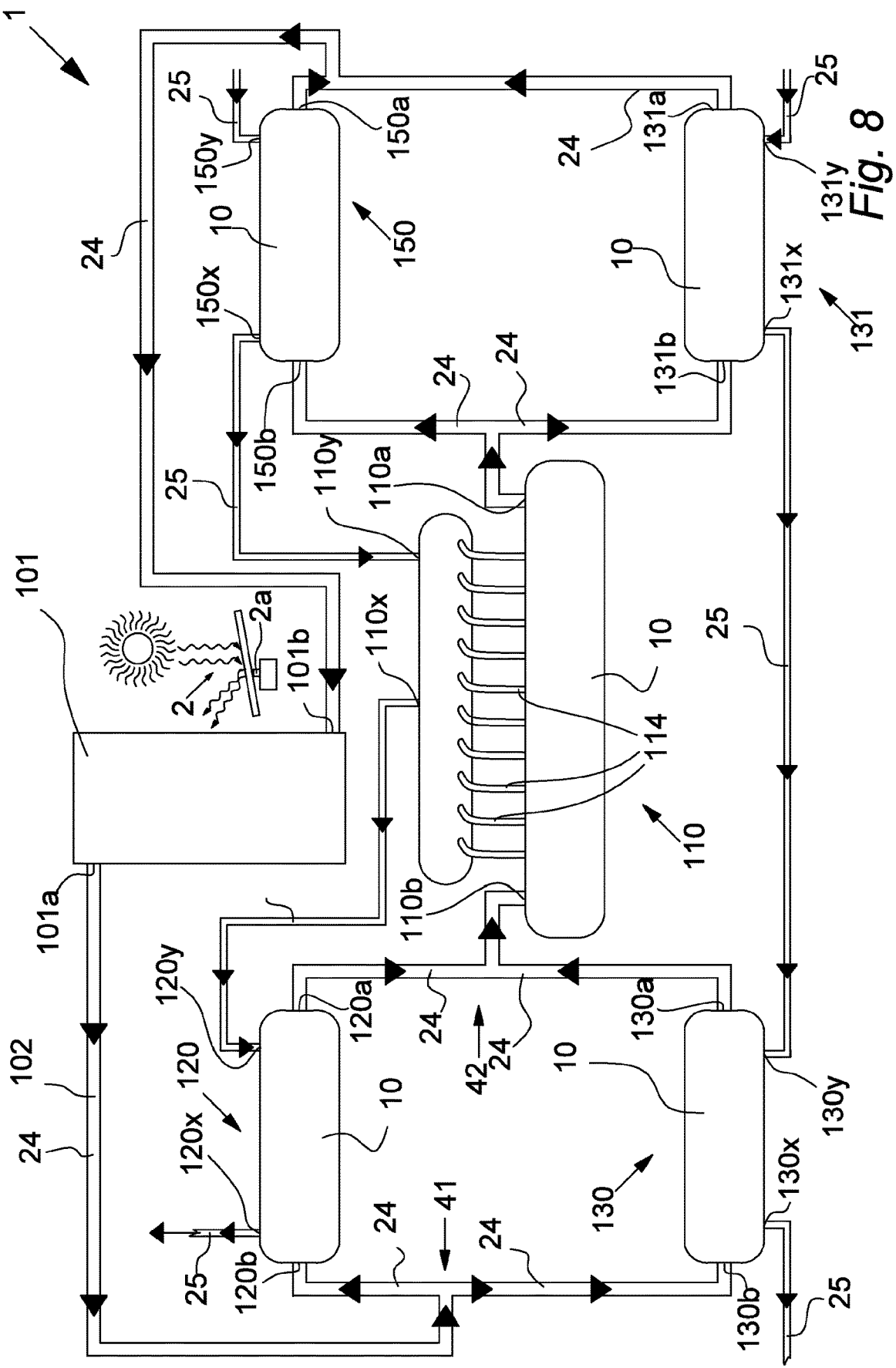

HEAT EXCHANGER WITH PIPE BUNDLE

BACKGROUND OF THE INVENTION

Field of Invention

This application is a national application based on Patent Cooperation Treaty Patent Application No. PCT/DK2020/050170, filed on Jun. 15, 2020, the entire contents of which are incorporated herein by reference.

This application claims under 35 U.S.C. § 119(a) the benefit of the filing date of Danish Patent Application No. PA201970376, filed on Jun. 17, 2019, the entire contents of which are incorporated herein by reference.

The present disclosure relates to a heat exchanger for providing heat exchange between fluids, use of one or more heat exchangers, and a solar power plant including one or more heat exchangers.

Description of Related Art

The performance of heat exchangers for use in energy and/or power plant systems such as concentrated solar power plant systems or in other industrial systems where heat is to be generated by means of heat exchangers is important. Such systems may be configured to generate industrial process heat and/or electric power for the utility grid. The power source for the heating may e.g. be concentrated solar power or another type of energy source.

Parameters such as weight and efficiency become increasingly relevant parameters when providing heat exchangers for use in industrial large scale power plant systems.

Heat exchangers for use in for example solar power plants may include pipe bundles in a container for containing a fluid such as e.g. water, steam, molten salt or thermal oil dependent on the heat exchanger use and configuration. EP 22 78 220 B1 and EP 2 322 854 B1 discloses examples of a heat exchanger for a solar power plant comprising tubes/pipes arranged in a container.

However, existing heat exchanger solutions for larger industrial applications may suffer from drawbacks relating to e.g. efficiency when compared to physical size, and undesired pressure losses on the heat exchanger.

The present disclosure may e.g. provide one or more solutions for a heat exchanger, which for example may provide a stable heat exchanger solution with a reduced pressure loss and/or an improved performance in a space saving manner.

SUMMARY

The present disclosure generally relates to especially a heat exchanger solution for use in industrial large scale power plant systems such as concentrated solar power plants for generating industrial heat and/or electric power for the utility grid, and/or for use in other large scale industry applications for e.g. producing for example industrial process heat by means of solar power or another type of power source. It may be used in systems for generating a heated fluid such as steam, and may hence e.g. be part of an evaporator unit/system, but it may also be another type of heat exchanger.

In one or more aspects of the present disclosure the present disclosure relates to a heat exchanger for providing heat exchange between fluids, wherein the heat exchanger includes:

a container configured to house a first fluid, a first pipe connector and a second pipe connector, each pipe connector including a cavity, wherein each of the first and second pipe connectors includes comprises a plurality of pipe connection points distributed at the pipe connectors, and a pipe bundle arranged inside the container and extending between the first and second pipe connectors, wherein the pipes of the pipe bundle are configured to guide a second fluid.

The pipe bundle in the container is connected to the first and second pipe connectors at the pipe connection points so that the inside of the pipes of the pipe bundle is in fluid communication with the cavities of the first and second pipe connector and thereby provides flow paths configured to guide the second fluid between the first and second pipe connectors. The heat exchanger is configured to provide a heat transfer between the first fluid and the second fluid through the pipe walls of the pipes of the pipe bundle, and said pipes of the pipe bundle are distributed in layers of pipes. A plurality of pipes of each of the layers of pipes each includes two bends, where each of the bends is provided between two flow path sections of the respective pipe which extend in the longitudinal direction of the container, so that the respective pipe provides three substantially parallel flow path sections. The length of a longer of the flow path sections of the respective pipe may be greater, such as at least 1.7 times greater, than the length of the other two shorter flow path sections of the pipe.

Especially when manufacturing heat exchangers for larger systems such as concentrated solar power plants, for industrial heating and/or the like, parameters such as heat exchanger weight, space consumption, and pressure loss in the pipes becomes increasingly important factors.

Adjusting the heat exchanger performance to increase the power performance of a heat exchanger of the type including a pipe bundle in a container may be possible by increasing the space in the container where the pipe bundle is arranged. However, this may increase the space consumption, manufacturing costs and weight of the heat exchanger. Adjusting the performance of the heat exchanger to reduce the power performance by reducing the number of flow paths may result in a further pressure loss, which is normally not a desired outcome.

Making the container containing the pipe bundle longer and narrower may allow a lower weight and hence lower costs of the heat exchanger. However, when increasing the length of the container, this may also risk greatly increasing the pressure loss in the pipes of the pipe bundle.

The present inventors have hence developed a solution where a plurality of pipes such as substantially all pipes of the pipe bundle inside the container providing flow paths between the pipe connectors are provided with two bends/bend sections, which together provides three parallel flow path sections in the longitudinal direction of the container. In this pipe layout, the length of one of the flow path sections may be significantly greater, such as at least 1.7 times greater, than the length of the other two shorter flow path sections of the same pipe. This pipe layout may e.g. help to provide more space for further pipes and hence further flow paths in the respective pipe layer. An outcome of this may be that the pressure loss in the pipe bundle may be reduced significantly without increasing the size of the heat exchanger.

Utilizing this pipe design/layout in a heat exchanger's container may provide the opportunity to reduce the pressure loss in the heat exchanger by more than a factor of two, and even reduced by more than a factor of three. This may accordingly e.g. help to reduce power consumption in a cost efficient and space saving way in the system utilizing the heat exchanger.

Additionally, this pipe design may also enable a longer and narrower container for the pipe bundle while having a reduced pressure loss, and hence help to enable providing a more cost efficient container with a reduced weight.

The above mentioned heat exchanger solution may e.g. be especially suitable for heat exchangers configured to provide a thermal power above 5 MW thermal power, such as above 10 MW thermal power, for example above 20 MW thermal power or above 25 MW thermal power.

The layer of pipes may e.g. in aspects of the present disclosure be configured to be arranged in a horizontal or vertical plane inside the container between the pipe connectors during operation.

The number of flow paths in the pipe layer and/or pipe bundle may in one or more aspects of the present disclosure be equal the number of longer flow path sections in the respective pipe layer and/or pipe bundle.

A first of the bends is provided between the longer flow path section and a first of said shorter flow path section, and the other of the bends is provided between the first, shorter flow path section and the other shorter flow path section.

There have been indications that such a pipe layout may help to provide an optimized space consumption and hence help to provide further space that may be used for further pipes. It may also be advantageous from at least a manufacturing perspective, and may help to enable reducing the overall heat exchanger weight while obtaining a lower pressure loss in the flow paths.

Each of the layers of pipes includes two pipe subgroups, wherein the longer of the flow path sections of one of the subgroups is connected to a first of the pipe connectors, and wherein the longer (S1) of the flow path sections of the other of the subgroups is connected to the other of the pipe connectors. This may be an especially advantageous solution where the utilization of the space in the container is optimized while obtaining a reduced pressure loss, and/or which may be more easy to manufacturing.

Furthermore, the bend between the two shorter flow path sections of the respective pipes in one of the pipe subgroups in the pipe layer is arranged substantially opposite to bends extending between the two shorter flow path sections of pipes in the other pipe subgroup of the same pipe layer.

Such a pipe layout of the pipe layers may e.g. help to provide a solution may be less complex and/or more cost efficient to manufacture and/or provide a solution where the utilization of the space in the container is enhanced to optimize the number of flow paths and performance of the heat exchanger.

The bends between the two shorter flow path sections of the respective pipes in one of the pipe subgroups in the pipe layer arranged opposite to each other may be in aspects of the present disclosure be arranged at the middle section between the pipe connectors. For example within 5%-15% of the length between the pipe connectors from an envisaged middle line drawn between the pipe connectors and extending perpendicular to the longitudinal direction of the container.

In one or more aspects of the present disclosure, a part of the longer flow path section of the respective pipe may extend in the longitudinal direction of the container next to a part of the shorter flow path sections of the respective pipe. This may provide a "side by side" layout that may e.g. help to further reduce space consumption inside the container, which may also be advantageous from a manufacturing perspective, and may thus help to enable reducing the overall heat exchanger weight while obtaining a lower pressure loss in the flow paths.

In one or more aspects of the present disclosure, it is understood that the flow paths may extend so that the longer flow path sections of one of the pipe subgroups extends from a first of the pipe connectors (e.g. arranged at a first end part of the container), and continues into the bend provided between the longer flow path section and a first of the shorter flow path sections. The second, shorter flow path section of the first subgroup may hence be connected to the second pipe connector. In a similar way, the longer flow path sections of the other subgroup extends from the other pipe connector (e.g. arranged at the other end part of the container), and continues therefrom into the bend provided between the longer flow path section the first of the shorter flow path sections of this other pipe subgroup. The second, shorter flow path section of the second/other subgroup may hence be connected to the first pipe connector.

The connection between the longer, such as substantially straight/linear, flow path sections, may in one or more aspects of the present disclosure be provided by an intermediate pipe connection part interconnecting the longer flow path section and a desired pipe connection point of the respective pipe connector.

In one or more aspects of the present disclosure, the bend connecting the longer of the flow path sections with a shorter flow path section of one of the subgroups may be placed proximate a first of the pipe connectors, and the bend connecting the longer of the flow path sections with a shorter flow path section of the other of the subgroups is placed proximate the other of the pipe connectors.

In one or more aspects of the present disclosure, the longer flow path sections of the respective pipe, such as in a pipe layer, may extend in the longitudinal direction of the container next to and parallel to the shorter flow path sections of both first and second subgroups (SG1, SG2).

This may e.g. help to provide a layered pipe layout that may more easy to manufacture and/or provide a solution where the utilization of the space in the container is enhanced.

In one or more aspects of the present disclosure, the shorter flow path sections of the first and second subgroups may be arranged between and parallel to the longer flow path sections of the first and second sub groups. This may provide a space saving solution that may be easy to manufacture, and which may help to provide a solution where an increased number of flow paths may be enabled in the respective pipe layer.

In one or more aspects of the present disclosure, a plurality of the layers of pipes each include two pipe subgroups, and wherein the two shorter flow path sections of the respective pipes in one of the pipe subgroups in the pipe layer are arranged substantially in continuation of the shorter flow path sections of pipes in the other pipe subgroup of the same pipe layer.

This solution may e.g. in particular provide space saving and hence space optimizing solution where the pressure loss may be reduced in a cost efficient and space saving manner. It may also provide a solution that may be advantageous from a manufacturing point of view.

In one or more aspects of the present disclosure, each pipe subgroup may include a plurality of pipes arranged next to each other so that crests of one or more of said pipes at the first and second bends of the respective subgroup extends into troughs of the first and second beds of one or more other pipes of the same subgroup.

This may e.g. help to optimize the space consumption of the pipes in a pipe layer and thus provide a solution where an increased number of flow paths may be provided in a pipe layer In one or more aspects of the present disclosure, the number of flow paths in the first subgroup and the number of flow paths in the second subgroup may be equal and/or the same.

This may be advantageous from a space consumption perspective and/or in order to provide an improved and more even flow of the second fluid in the pipes in the pipe layer. It is understood that in other aspects of the present disclosure, the number of flow paths in the first subgroup and the number of flow paths in the second subgroup may not be equal and/or the same.

In one or more aspects of the present disclosure, one or a plurality of the subgroups may include at least two or three pipes, e.g. at least four pipes such as at least six pipes such as at least eight pipes arranged side by side, such as in a plane defined by the pipe layer.

This may e.g. increase the performance of the heat exchanger compared to the heat exchanger's physical size.

In one or more aspects of the present disclosure, at least 70% such as at least 80% or 90% of the subgroups in the pipe bundle include at least three, such as at least four pipes, e.g. at least six pipes.

In one or more aspects of the present disclosure, at least % such as at least 80% of the subgroups in the pipe bundle include at least three, such as at least four pipes, e.g. at least six pipes.

In one or more aspects of the present disclosure, the number of longer flow path sections and the number of shorter flow path sections in each pipe layer is the same. This may e.g. in further embodiments apply for all pipe layers of the pipe bundle. For example, in case of a total number of 32 flow path sections of a pipe layer, counted in a cross sectional plane perpendicular to the longitudinal direction of the container extending through the pipe layer, sixteen of these will be longer flow path sections and the remaining sixteen flow path sections will be shorter flow part sections.

In one or more aspects of the present disclosure, the number of longer flow path sections and the number of shorter flow path sections in the pipe bundle counted in a cross-sectional plane extending perpendicular to the longitudinal direction of the container and extending through the pipe bundle, may be the same.

In one or more aspects of the present disclosure, the pipes of each of the subgroups provides a broader subgroup section and a narrower subgroup section, thereby providing a space next to the narrower subgroup section. The broader subgroup section of one of the subgroups may thus extend into the space next to the narrower subgroup section of the other subgroup.

This may e.g. help to provide a space saving solution where a reduced pressure loss in the pipes may be obtained, and which may be advantageous to manufacture. This may e.g. apply for each of a plurality, such as all, layers of the pipe bundle. The broader subgroup section may be placed in one half of the container's cavity, while the narrower subgroup section is placed in the other half of the container's cavity (determined in the longitudinal direction of the container).

In one or more aspects of the present disclosure, one or more of the pipe layers may include at least four flow paths such as at least eight flow paths, e.g. at least twelve flow paths such as at least eighteen flow paths arranged side by side such as substantially in a plane defined by the pipe layer.

Generally, in one or more aspects of the present disclosure, the layers of pipes may each include between four and 24 pipes, such as between eight and sixteen pipes, preferably an even number of pipes. For example, in aspects, a layer of pipes may include at least four pipes such as at least six pipes, e.g. at least eight pipes such as at least ten pipes.

In one or more aspects of the present disclosure, the length of the flow paths in the respective pipe layer may vary less than 10%, such as less than 5%, e.g. less than 2%, and/or wherein the length of the flow paths in said pipe bundle varies less than 10%, such as less than 5%, e.g. less than 2%. The pipe layout may help to provide a solution where e.g. a more evenly distributed flow may be obtained in the pipe bundle.

In one or more aspects of the present disclosure, one of the first and second fluids may be molten salt or thermal oil, and/or wherein the other of said first and second fluids (24, 25) may be water and/or steam.

For example an evaporator unit solution where waters is to be evaporated into steam, it may in embodiments of the present disclosure be preferred that the fluid inside the pipes of the pipe bundle may be configured to be thermal oil or molten salt or another heat transferring medium such as a liquid, and the other fluid in the cavity of the container, placed between the pipe bundle and the walls of the container may be water and/or steam.

In one or more aspects of the present disclosure, the heat exchanger may be part of an evaporator unit/arrangement and is configured to generate steam from a first of the fluids in the container's cavity by providing a phase transition of this fluid by means of the other of the fluids inside the pipes of the pipe bundle.

The pipe layout providing the parallel longer and two shorter flow path sections of each pipe may be especially suitable for an evaporator unit solution for generating steam from water. Heat exchangers for such evaporator units may need to be rather long in order to provide space for a plurality of riser pipes connecting the heat exchanger and a steam container/drum for receiving the steam generated in the heat exchanger. The present disclosure may hence help to provide a solution that may especially suitable for longer and narrower heat exchangers of e.g. evaporator units.

In one or more aspects of the present disclosure, the evaporator unit may include one or more of the heat exchangers, and a further steam container.

The evaporator unit may in one or more aspects of the present disclosure include an inlet for a fluid such as water, wherein the evaporator unit includes a riser arrangement, such as a plurality of riser pipes, configured so that fluid supplied to the evaporator unit and evaporated in the one or more heat exchangers of the evaporator unit is circulated to the steam container through the riser arrangement, and wherein the steam container includes a steam outlet for the evaporated steam.

Such evaporator units may be especially suitable for use in industrial high power systems such as e.g. concentrated solar power systems, industrial heating systems and/or the like.

In one or more aspects of the present disclosure, the steam container may include a separation arrangement for separating liquid from said steam received from the one or more heat exchangers of the evaporator unit before the steam enters the outlet.

In one or more aspects of the present disclosure, the steam container is in fluid communication with the one or more heat exchangers of the evaporator unit so as to supply water to the heat exchangers. Generally, the plurality of layers of pipes may in aspects of the present disclosure be distributed in a direction transverse to a longitudinal direction of the container.

In one or more aspects of the present disclosure, the layers of pipes may be of different width in a direction transverse to a longitudinal direction of the container, and wherein layers of smaller width include fewer pipes than layers of larger width, such as so that the width of the layers of pipes are adapted to the cross sectional shape of the container.

The width of the layers of pipes may in aspects of the present disclosure be adapted to the cross sectional shape of the container. This may e.g. help to improve performance of the heat exchanger. The container may e.g. in aspects of the present disclosure have a substantially circular cross sectional shape.

The width of the layer of pipes of the smallest width may in aspects of the present disclosure be 80% or less than the width of the layer of pipes of the largest width, such as 70% or less.

In one or more aspects of the present disclosure, the three substantially parallel flow path sections may be straight, flow path sections arranged side-by-side in the same layer of pipes.

In one or more aspects of the present disclosure, the pipe connectors may be tubular shaped pipe connectors extending into the cavity of the container, such as in a direction substantially perpendicular to the longitudinal direction of the container.

The present disclosure additionally relates to use of one or more heat exchangers according to the above disclosure in an evaporator unit, wherein the evaporator unit includes:
one or more of the heat exchangers, and a further steam container,
an inlet for a fluid such as water,
a riser arrangement configured so that steam supplied to the evaporator unit and evaporated in the one or more of the heat exchangers of the evaporator unit is configured to be circulated to the steam container, and
a steam outlet for the evaporated steam.

This may provide one or more of the above mentioned effects and hence provide an improved evaporator unit/arrangement.

Additionally, the present disclosure relates to a solar power plant comprising including one or more heat exchangers according to the above disclosure.

In one or more aspects of the solar power plant, the one or more heat exchangers may be arranged in an evaporator unit of the solar power plant.

In one or more aspects of the solar power plant, the one or more heat exchangers may be arranged in of configured to provide a super heater, a re-heater and/or an economizer of the solar power plant.

Additionally, the present disclosure relates to an evaporator unit for generating steam, wherein the evaporator unit includes:
one or more heat exchangers according to any of the preceding aspects, and a steam container, wherein the evaporator unit includes a riser arrangement, such as a plurality of riser pipes, configured so that fluid supplied to the evaporator unit and evaporated in the one or more heat exchangers is/will be circulated to the steam container of the evaporator unit through the riser arrangement, and
wherein the steam container includes a steam outlet for the steam.

Moreover, the present disclosure relates in a still further aspect to a heat exchanger for providing heat exchange between fluids, wherein the heat exchanger includes:
a container configured to house a first fluid
a first pipe connector and a second pipe connector, each pipe connector including a cavity, wherein each of the first and second pipe connectors includes a plurality of pipe connection points distributed at the pipe connectors, and
a pipe bundle arranged inside the container and extending between the first and second pipe connectors, wherein the pipes of the pipe bundle are configured to guide a second fluid,
wherein the pipe bundle in the container is connected to the first and second pipe connectors at the pipe connection points so that the inside of the pipes of the pipe bundle is in fluid communication with the cavities of the first and second pipe connector and thereby provides flow paths configured to guide said second fluid between the first and second pipe connectors, wherein the heat exchanger is configured to provide a heat transfer between the first fluid and the second fluid through the pipe walls of the pipes of the pipe bundle. The pipes of the pipe bundle may be distributed in layers of pipes. A plurality of pipes of each of the layers of pipes may each include two bends, where each of the bends is provided between two flow path sections of the respective pipe which extend in the longitudinal direction of the container, so that the respective pipe provides three substantially parallel flow path sections. The length of a longer of said flow path sections of the respective pipe is greater than the length of the other two shorter flow path sections of the pipe, and a plurality of the layers of pipes may each include two pipe subgroups, and wherein the two shorter flow path sections of the respective pipes in one of the pipe subgroups in the pipe layer are arranged substantially in continuation of the shorter flow path sections of pipes in the other pipe subgroup of the same pipe layer.

In one or more aspects of the heat exchanger according to the above mentioned still further aspect may be a heat exchanger according to the disclosure herein. It is here understood that in further embodiments the length of a longer of the flow path sections of the respective pipe may though be less than 1.7 times greater than the length of the other two shorter flow path sections of the respective pipe, such as e.g. 1.3 or 1.5 times greater than the length of the other two shorter flow path sections of the respective pipe.

It is generally understood that the length of comparable, shorter flow path sections of the first and second sub-groups in continuation of each other may have the same length, which may e.g. be advantageous from a flow distribution perspective, and/or manufacturing cost optimization perspective. However, in other aspects of the present disclosure, the lengths of the shorter flow path sections arranged opposite to and in continuation of each other in the same pipe layer may be different.

The present disclosure additionally relates to use of a heat exchanger according to the disclosure herein in for providing industrial heat and/or electric power in a system, such as in a solar power plant.

Moreover, the present disclosure relates to a system, such as a solar power plant or another type of system, such as an industrial hating system, including one or more heat exchangers according to the disclosure herein.

FIGURES

Figure 4:
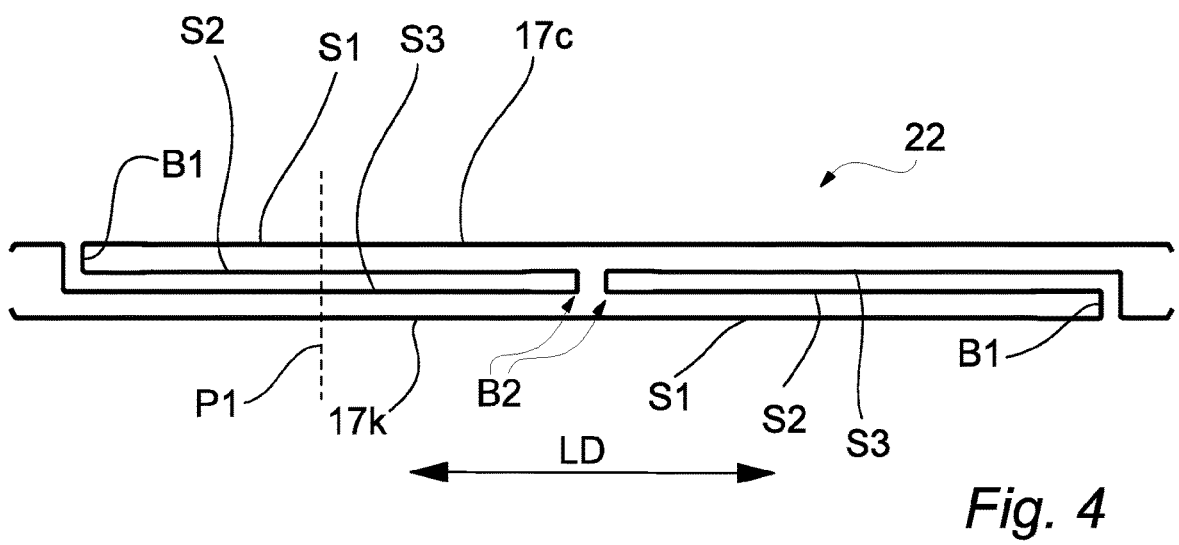
Figure 5:
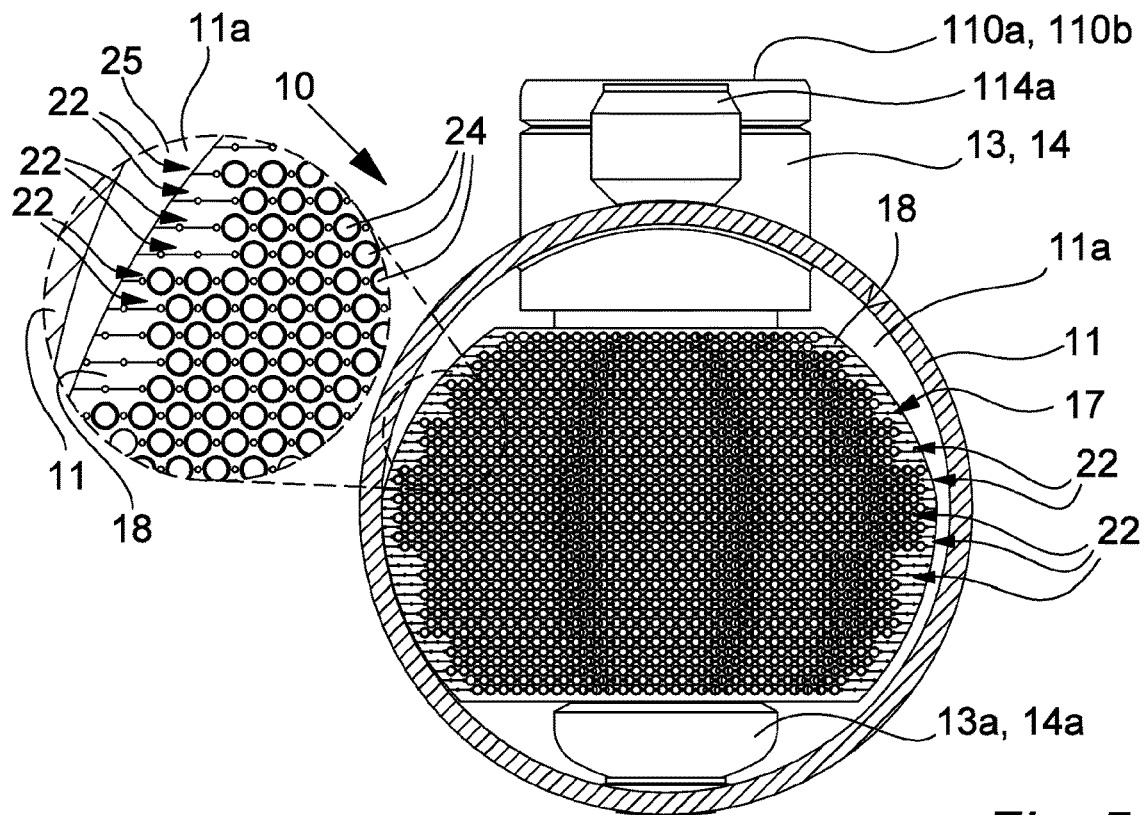
Figure 6:
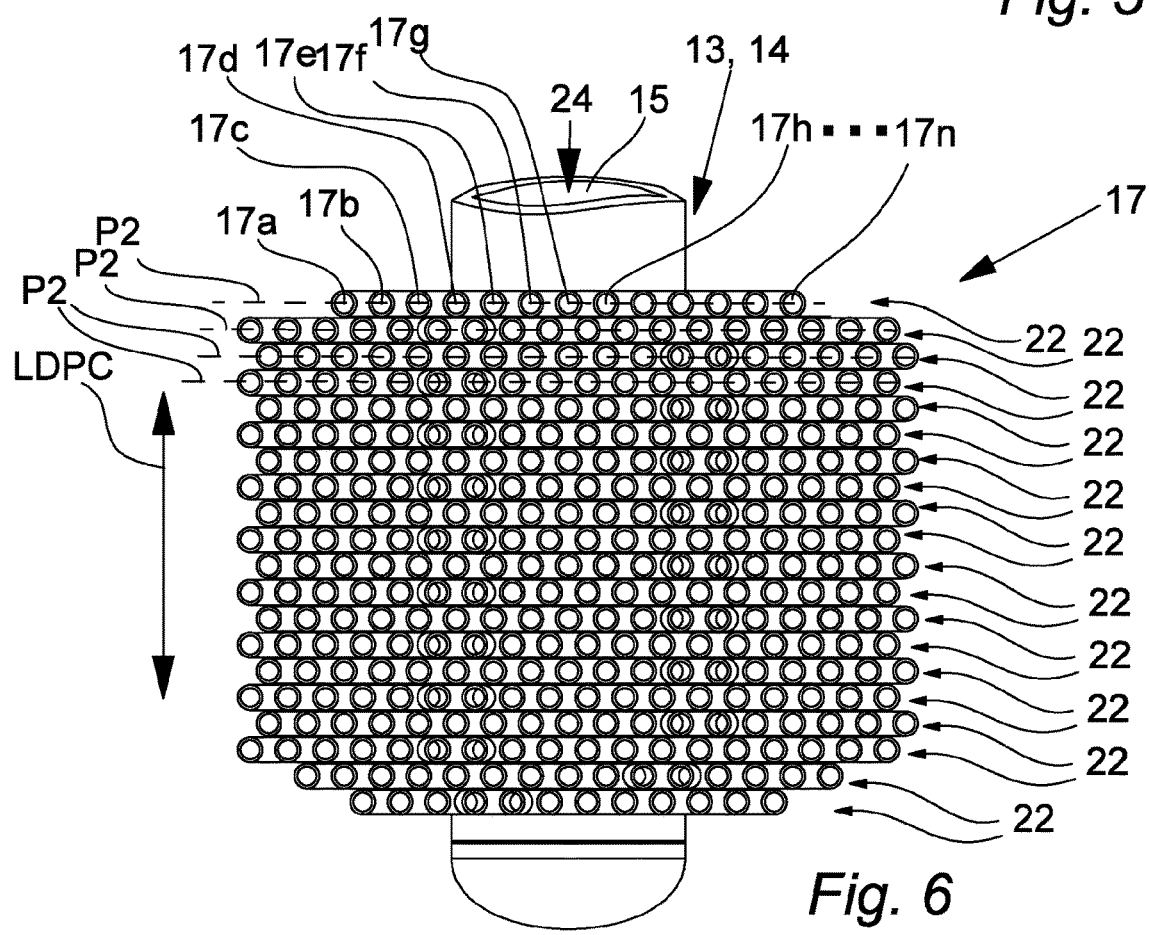
Figure 7:
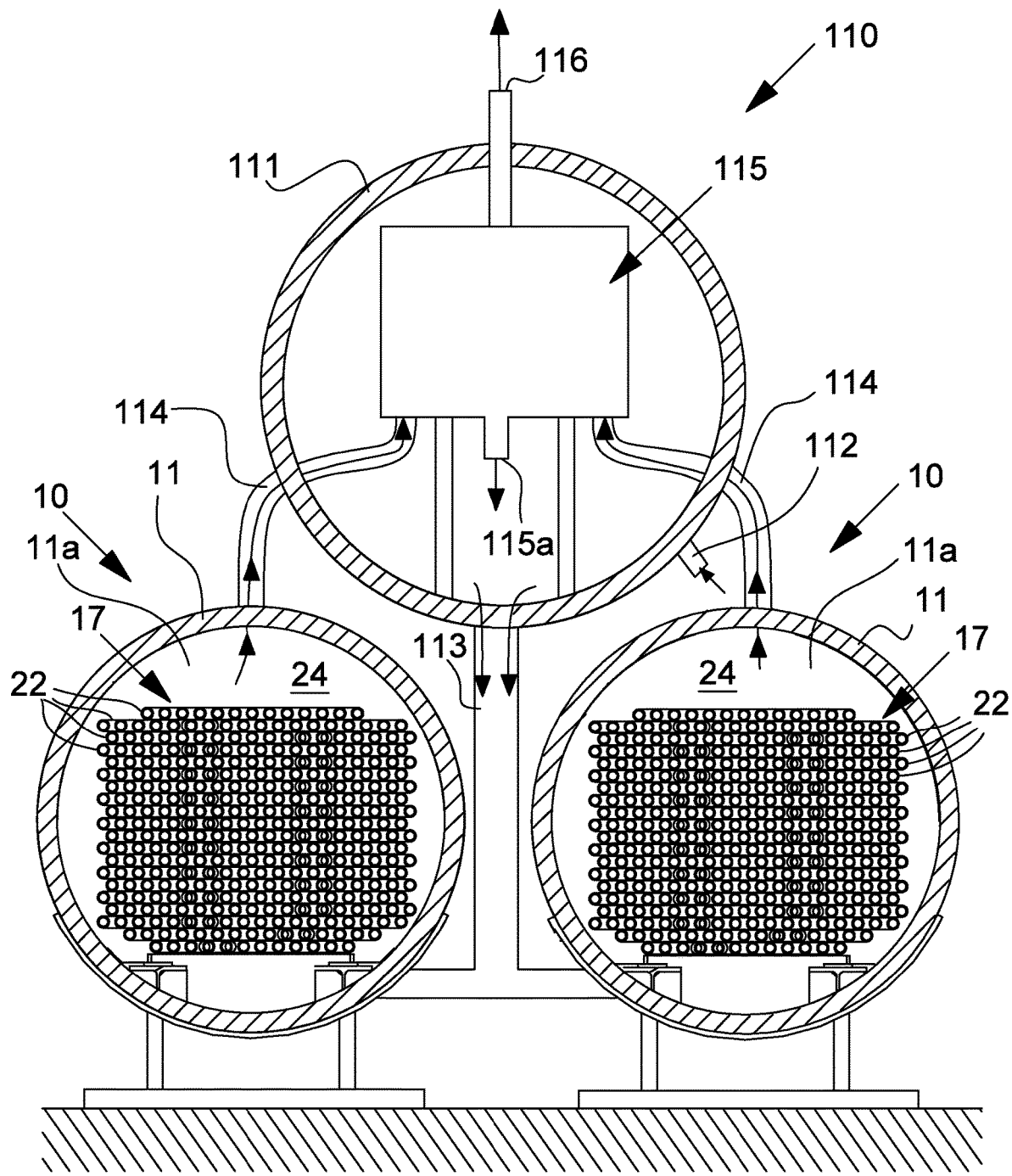
Figure 8A:
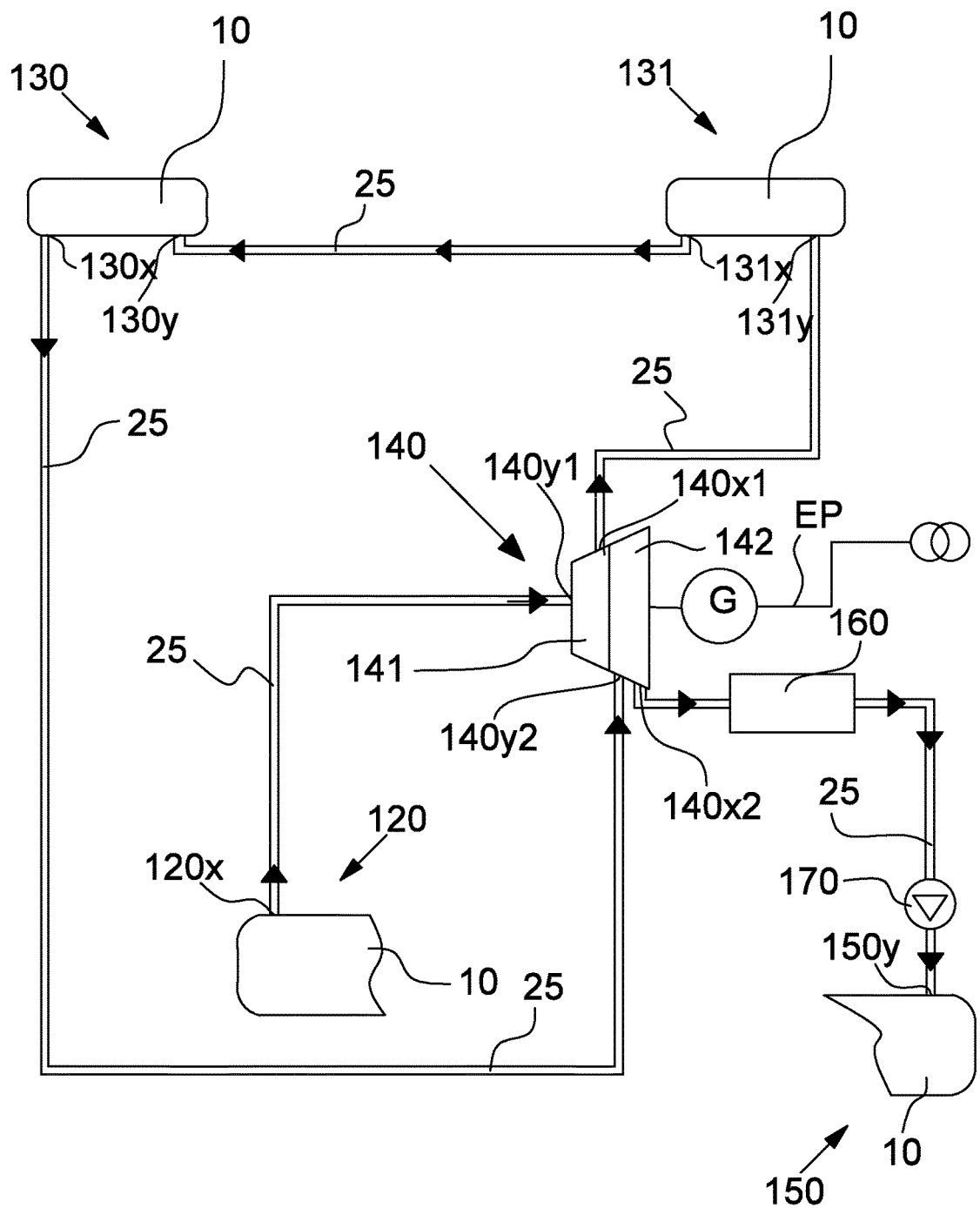
Figure 9:
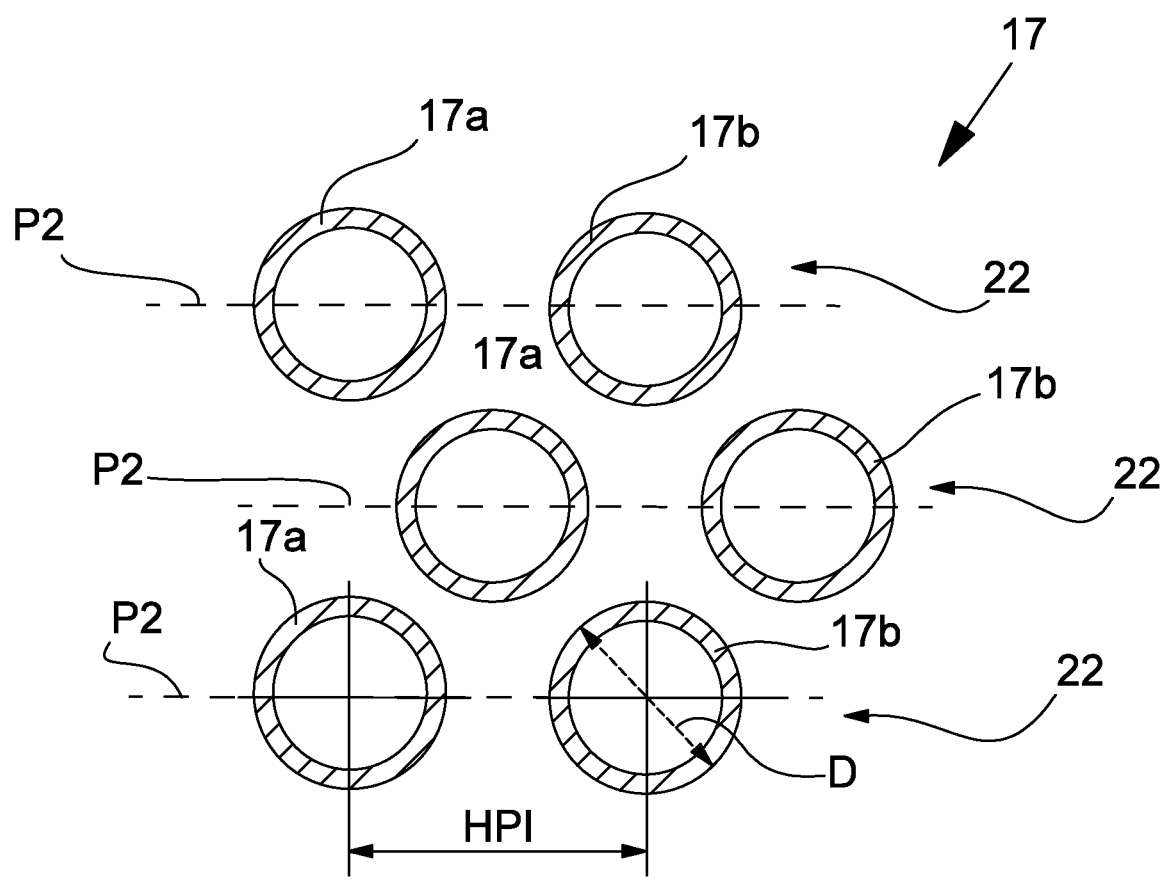

Aspects of the present disclosure will be described in the following with reference to the figures in which:

FIG. 1 illustrates a heat exchanger including a pipe bundle according to embodiments of the present disclosure, FIG. 2: illustrates a layer of pipes in a subgroup layout for a heat exchanger according to embodiments of the present disclosure, FIGS. 3 and 4: illustrates a pipe layout for a heat exchanger providing longer and shorter flow paths sections of the respective pipe according to further embodiments of the present disclosure, FIG. 5: illustrates a heat exchanger according to further embodiments of the present disclosure, FIG. 6: illustrates a pipe connector according to embodiments of the present disclosure, FIG. 7: illustrates an evaporator unit according to embodiments of the present disclosure, FIG. 8: illustrates a solar power system according to embodiments of the present disclosure, FIG. 8a: illustrates a steam turbine setup according to embodiments of the present disclosure, and FIG. 9: illustrates schematically a part of a pipe bundle according to embodiments of the present disclosure.

DETAILED DESCRIPTION

FIG. 1 illustrates schematically a heat exchanger 10 according to embodiments of the present disclosure. The heat exchanger is configured to provide heat exchange between first and second fluids 24, 25. The heat exchanger includes a container 11 such as a tubular metal container providing an interior cavity 11a.

The container 11 includes an inlet 110b and an outlet 110a for a first fluid 24 such as e.g. molten salt, thermal oil, water and/or steam or any other suitable fluid dependent on the heat exchanger configuration and use. In further embodiments, the container may include a plurality of inlets 110b and/or a plurality of outlets 110a for the first fluid 24.

In embodiments of the present disclosure, the first fluid 24 is the heat transferring fluid configured to transfer heat from the fluid 24 inside of the pipes of a pipe bundle 17, through the walls of the pipes and to a second fluid 25 arranged in the container's 11 cavity 11a. In other embodiments, the heat transfer may be provided from the fluid 25, and to the fluid 24 in the pipes of the bundle 17.

First and second pipe connectors 13, 14 are extending through the container's side wall 11 and into the container's cavity 11a. These may generally, in embodiments of the present disclosure, be pipe connectors, also known as headers, having a tubular shape. Such pipe connectors are described in more details below in relation to FIG. 6. Each of the first and second pipe connectors 13, 14 includes a plurality of pipe connection points 16 distributed at the pipe connectors 13, 14 around the periphery of the respective tubular shaped pipe connector 13, 14.

The pipe bundle 17 including a plurality of pipes is arranged inside the container 11 of the heat exchanger 10, and the pipes of this bundle extends between the first and second pipe connectors 13, 14 and are connected to the pipe connectors at the pipe connection points 16.

The pipes of the pipe bundle 17 are configured to guide a fluid such as water and/or steam, molten salt, thermal oil or any other suitable fluid dependent on the use and configuration of the heat exchanger 10. The pipe connectors are hence in fluid communication by means of the pipes of the pipe bundle 17.

Only a single layer 22 of pipes are visible in FIGS. 1 and 2 in order to enhance the figure simplicity. Moreover, the number of pipes/flow paths in the pipe layer 22 has also been reduced to six flow paths in FIGS. 1 and 2 so as to enhance the figure simplicity. However, the layer 22 in FIGS. 1 and 2 may in practice include double the number of flow paths/pipes 17a-17n or even more (see e.g. FIG. 5), and these may be arranged between the illustrated pipes of the pipe layer 22 in order to e.g. provide a more space saving pipe bundle 17 solution.

The pipes of the pipe bundle 17 are connected to the first and second pipe connectors 13, 14 at the pipe connection points 16 so that the inside of the pipes of the pipe bundle 17 is in fluid communication with the cavities 15 of the first and second pipe connector 13, 14. Thereby each pipe provides a flow path configured to guide the fluid 24 in the pipes of the pipe bundle between the first and second pipe connectors 13, 14. This hence provides a heat transfer between the fluid 24 in the pipes and the fluid 25 in the cavity 11a through the walls of the pipes of the pipe bundle 17.

In embodiments of the present disclosure, a fluid 24 such as molten salt or thermal oil or the like may be configured to flow in the pipes of the pipe bundle 17. Here, a fluid 25 such as water and/or steam may be provided in the container's cavity 11a, so as to provide an evaporation of water or a further heating of steam by a transfer of heat from the fluid 24 in the pipes of the pipe bundle 17 to the first fluid 25 through the walls of the pipes of the pipe bundle. In other configurations, the fluid 24 in the pipes of the pipe bundle 24 may be e.g. water or steam, and the fluid 25 in the container's cavity 11a may be e.g. molten salt or thermal oil. This may however depend on the use and configuration the heat exchanger. Hence, in some embodiments of the present disclosure, the fluid in the container's cavity 11a may be configured to transfer heat to the fluid 24 in the pipes of the pipe bundle, whereas in other embodiments of the present disclosure, it may be the fluid 24 in the pipes of the pipe bundle 17 that is configured to transfer heat to the fluid 25 in the container cavity 11a. The latter example may be preferred if the heat exchanger 10 is installed in an evaporator unit/solution, see e.g. FIG. 7 and the description thereto.

The heat exchanger 10 may e.g. in embodiments of the present disclosure be configured to be part of or provide a super heater, an evaporator unit, a reheater, an economizer, a pre-heater and/or the like.

The pipes of the pipe bundle 17 are embodiments of the present disclosure distributed in a plurality of substantially parallel layers of pipes 17a-17n, where one layer 22 is illustrated in FIGS. 1 and 1a. Embodiments of a pipe bundle 17 including a plurality of pipe layers 22 according to aspects of the present disclosure is described in more details later on in relation to further figures, see e.g. FIGS. 5 and 6.

Each pipe 17a-17n of the pipe bundle 17 may in embodiments of the present disclosure have an outer diameter between 10 mm and 50 mm, such as between 18 mm and 30 mm, e.g. around 25 mm.

The wall thickness of the pipes of the pipe bundle 17 may in embodiments of the present disclosure be between 0.5 mm and 10 mm, such as between 1 mm and 7 mm, for example between 1.5 mm and 6 mm.

The wall thickness of the wall of the container 11 enclosing the pipe bundle 17 and extending around the pipe bundle and in the longitudinal direction LD of the container 11 may in embodiments of the present disclosure be above 10 mm, such as above 20 mm, for example above 50 mm. the wall thickness of the wall of the container 11 may in embodiments of the present disclosure be below 400 mm, such as below 300 mm, e.g. below 200 mm. For example, in embodiments of the present disclosure, the wall thickness of the wall of the container 11 may be in the range of 10 mm to 400 mm, such as between 10 mm to 300 mm, for example between 20 mm and 200 mm.

The heat exchanger's container 11 may hence generally, in embodiments of the present disclosure, be of a tubular shape and be configured to operate in systems where the pressure in the container's 11 cavity 11a during operation may be above 5 bar, such as above 25 bar, for example above 100 bar such as above 120 bar or above 150 bar. The heat exchanger may in embodiments of the present disclosure be designed to handle a pressure in the container's cavity 11a that is below 300 bar, such as below 250 bar, e.g. below 200 bar.

The heat exchanger may in embodiments of the present disclosure be designed to handle a pressure in the container's cavity that is within the range of 4 bar to 300 bar, such as within 25 bar to 250 bar, for example within 50 bar to 250 bar, or within 100 bar to 250 bar.

The heat exchanger may in embodiments of the present disclosure be designed and configured to provide Above 5 MW thermal power, such as above 10 MW thermal power, for example above 20 MW thermal power or above 25 MW thermal power The heat exchanger may in embodiments of the present disclosure be designed/configured to provide no more than Max 600 MW thermal power, such as no more than 300 MW thermal power, for example no more than 200 MW thermal power or no more than 120 MW thermal power. This may be including heat loss in the heat exchanger, which, during operation may be no more than 2%.

The thermal power may e.g. be determined by measuring the difference between the inlet and outlet temperature of the heat transferring fluid, and the amount of flow of the heat transferring fluid per time unit.

FIG. 2 illustrates schematically a partly exploded view of the layer 22 of pipes 17a-17n of the pipe bundle 17 illustrated in FIG. 1 according to embodiments of the present disclosure.

As can be seen from FIG. 2, the pipes of the layer 22 may in embodiments of the present disclosure be divided into two pipe subgroups SG1, SG2. The pipes of each of these subgroups SG1, SG2 provides a broader subgroup section SGb and a narrower subgroup section SGn of the respective subgroup SG1, SG2. The narrower subgroup section SGn thereby provides a space 7 next to the broader subgroup section, and the broader subgroup section SGb of one of the subgroups SG1, SG2 can thereby be configured to extend into this space 7 next to the narrower subgroup section of the other subgroup, see FIGS. 1 and 4.

For each subgroup SG1, SG2, the broader subgroup section SGb, due to the pipe layout provided by the bends B1, B2, includes three times as many flow path sections than the narrower subgroup section SGn, when seen in a cross sectional plane extending perpendicular to the longitudinal direction LD of the container 11.

The pipes 17a-17n of the layer 22 of pipes each include two bends B1, B2. Each of these bends B1, B2 is provided between two flow path sections S1, S2, S3 (see FIG. 3) of the respective pipe 17a-17n. These flow path sections S1, S2, S3 extend in the longitudinal direction LD of the container 11, so that the respective pipe provides three substantially parallel flow path sections S1, S2, S3 including a longer S1 flow path section and two shorter S2, S3 flow path sections.

The number of flow paths in the first subgroup SG1 and the number of flow paths in the second subgroup SG2 may in preferred embodiments of the present disclosure be the same.

As can be seen from e.g. FIGS. 1 and 2, the number of longer S1 flow path sections and the number of shorter S2 flow path sections in a pipe layer 22 may be the same when counted in a cross-sectional plane P1 extending perpendicular to the longitudinal direction LD of the container and through both longer and shorter flow path sections S1, S2, S3 of the layer 22. In the example of FIG. 1, there is six longer S1 and six shorter S2, S3 flow path sections counted in the layer 22 in the cross sectional plane P1.

The number of flow paths in the pipe layer and/or pipe bundle 17 may in embodiments be equal the number of longer S1 flow path sections.

FIGS. 3 and 4 illustrates schematically two flow paths 17c, 17k of a layer 22 of flow paths/pipes of the pipe bundle 17 according to further embodiments of the present disclosure, in the form of one flow path of each subgroup SG1, SG2. It is understood that the pipe layer 22 may include several of such pipes arranged next to each other, see e.g. FIGS. 1 and 2, but only two are illustrated in FIGS. 3-4 for explanatory purpose.

A first B1 of the bends is provided between the longer flow path section S1 and a first of the shorter flow path section S2, and the other B2 of the bends B1, B2 is provided between the first, shorter flow path section S2 and the other shorter flow path section S3. A part of the longer flow path section S1 of the respective pipe 17a-17n extends in the longitudinal direction of the container 11 next to a part of the shorter flow path sections S2, S3 of the respective pipe 17a-17n.

The length L1 of a longer S1 of the flow path sections S1-S3 of the respective pipe 17a-17n may in aspects of the present disclosure be at least 1.7 times greater than the length L2 of the other two shorter flow path sections S2, S3 of the respective pipe, such as at least 1.8 or at least 1.9 times than the length of the other two shorter flow path sections S2, S3 of the respective pipe. The length L1 of a longer S1 of the flow path sections S1-S3 of the respective pipe 17a-17n may in further aspects of the present disclosure be at least 1.3 or 1.5 times greater than the length L2 of the other two shorter flow path sections S2, S3 of the respective pipe.

The connection between the longer, such as substantially straight/linear, flow path sections, may in one or more embodiments of the present disclosure be provided by an intermediate pipe connection part interconnecting the longer flow path section and a desired pipe connection point of the respective pipe connector.

This length L1, L2 of the parallel flow path sections S1S3 may be measured between the bends B1, B2 and a further bend on the respective pipe provided at the above mentioned intermediate pipe connection part in order to lead the respective pipe to a pipe connection point 16 of a pipe connector 13, 14 (pipe connectors are not illustrated in FIGS. 3 and 4, see FIG. 1 or 2). The flow path sections S1, S2, S3 may preferably as illustrated hence be linear, straight, parallel arranged flow path sections.

As can be seen, the parallel flow part sections S1, S2, S3 of the pipe 17c of the respective subgroup are arranged parallel and side by side/next to each other. In FIG. 3, the two flow paths provided by the pipes 17c and 17k respectively of FIG. 3 are arranged as they would be in the heat exchanger's container 11, so that the broader sub group sections extend into the space 7 next to the narrower subgroup sections.

This provides that the bend B2 between the two shorter flow path sections S2, S3 of the respective pipes in one of the pipe subgroups SG1 in the pipe layer 22, in this case bend B2 of pipe 17c, is arranged substantially opposite to the bends B2 extending between the two shorter flow path sections S2, S3 of the pipes, in this case pipe 17k, in the other pipe subgroup SG2 of the same pipe layer 22.

These crests of the bends B2 of the first and second subgroup may face each other and be oppositely directed as illustrated in e.g. FIGS. 2 and 4.

The shorter flow path sections S2, S3 of the respective pipes in one of the pipe subgroups SG1 may hence as illustrated in FIGS. 2 and 4 in embodiments of the present disclosure be arranged substantially in continuation of the two shorter flow path sections S2, S3 of pipes in the other pipe subgroup SG2. This is enabled due to that a part of the broader subgroup sections SGb extends into/are arranged in the spaces 7 provided next to the narrower subgroup sections SGn, which is provided due to the pipe layout.

The longer flow path sections S1 of the respective pipe 17a-17n in the pipe layer 22 extend in the longitudinal direction LD of the container 11 next to and parallel to the shorter flow path sections S2, S3 of both first and second subgroups SG1, SG2 in the pipe layer 22. This may e.g. be provided so that the shorter flow path sections S2, S3 of the first and second subgroups SG1, SG2 are arranged between and parallel to the longer flow path sections S1 of the first and second sub groups SG1, SG2.

In a cross sectional view of the layer 22 in a plane P1 perpendicular to the longitudinal direction LD of the container 11, and provided at e.g. substantially at the middle section/area of the shorter S2, S3 flow path sections, the total number of parallel flow path sections S1, S2, S3 in a pipe layer 22 may in embodiments of the present disclosure be double the number of flow paths 17a-17n in the layer 22. Three fourths of these flow paths are part of the same subgroup SG1, SG2 as the bends B1 and B2 provides that one flow path of a subgroup SG1, SG provides/counts for three parallel flow path sections S1, S2, S3, and the remaining flow part section is the longer S1 flow path section of the other subgroup in the same pipe layer 22.

As can be seen from FIGS. 1 and 2, each pipe layer 22 may include a plurality of pipes arranged next to each other and divided in two subgroups SG1, SG2.

Each pipe in the layer 22 may hence be arranged (see e.g. FIG. 2) next to each other so that crests of the pipes at the first and second bends B1, B2 of the layer 22 extends into troughs provided by the first and second bends B1, B2 of other pipes of the same layer 22. This may as illustrated in FIGS. 1-4 so that for each subgroup SG1, SG2, crests of the pipes at the first and second bends B1, B2 of the respective subgroup SG1, SG2 extends into troughs provided by the first and second bends B1, B2 of other pipes of the same subgroup.

FIG. 5 illustrates schematically an example of a cross sectional view of a heat exchanger 10 according to embodiments of the present disclosure, in a plane (e.g. the location of plane P1 of FIG. 4) perpendicular the longitudinal direction of the container 11. The pipe bundle 17 is arranged in the heat exchanger cavity 11a.

As can be seen, the pipe bundle includes a plurality of layers 22 of pipes arranged parallel to each other. The neighboring pipe layers 22 (above/below each other) may as illustrated in embodiments of the present disclosure be arranged in a staggered manner. Additionally, the number of pipes in a pipe layer may in embodiments of the present disclosure differ between the layers, e.g. so that the number of pipes in a layer is adapted to the width of the cavity 11a, e.g. so that an increased number of pipes is placed at the pipe layer(s) 22 arranged at the widest part of the cavity 11a, while the number of pipes in the layers 22 arranged at more narrow parts of the cavity 11a are reduced/lower. The layers 22 of pipes may hence be of different width in a direction transverse to a longitudinal direction of the container, and layers of smaller width comprises fewer pipes 17a-17n than layers 22 of larger width. The width of the layer 22 of pipes of the smallest width (see e.g. top and bottom layers) may in aspects of the present disclosure be 80% or less than the width of the layer of pipes of the largest width, such as 70% or less.

The heat exchanger may in some embodiments of the present disclosure include a baffle arrangement 18 such as one or preferably a plurality of baffle plates/barriers/walls made of e.g. a metal. These 18 are distributed in the cavity 11a in the longitudinal direction of the container 11 (only one baffle arrangement 18 is though illustrated), and extending in a plane perpendicular to the longitudinal direction of the container. The baffle plates may be arranged to provide a pipe layer 22 support and/or help to provide a reduction of vibration of the pipes 22. The baffle plate may e.g. be made from a plurality of smaller metal sheets together forming a metal wall with holes/openings for the pipes of the pipe bundle.

As can be seen in FIG. 5, the pipes of the pipe bundle may be connected to the pipe connector 13, 14 at a pipe connection point arranged between the inlet/outlet 110a, 110b of the header, and the bottom end 13a, 14a of the pipe connector.

The container 11 may include (if the heat exchanger is used for an evaporator unit according to embodiments of the present disclosure) a plurality of riser pipe connectors 114a, each configured to be connected to a riser pipe for guiding steam to a steam drum arranged above the heat exchanger.

FIG. 6 illustrates schematically a pipe connector 13, 14 according to embodiments of the present disclosure, configured to be arranged in the container 11 and to be connected to the pipes of the pipe bundle 17 at the pipe connection points 16 as e.g. illustrated in FIG. 1.

The pipes of the pipe bundle 17 are as illustrated distributed in a plurality of parallel pipe layers 22 defining parallel pipe layer planes P2, in the present example configured to extend substantially horizontally, and perpendicular to the longitudinal direction LDPC of the pipe connector.

A plurality of these layers 22, such as all layers 22 may in embodiments of the present disclosure include a pipe layout as described in relation to one or more if FIGS. 1-4.

The longitudinal direction LDPC of the pipe connector 13, 14 may e.g. extend perpendicular to the longitudinal direction LD of the container 11, and the pipes of the pipe layers 22 are connected to the pipe connector along the length of the pipe connector 13, 14, and distributed around the pipe connector. The pipe connectors may e.g. have a tubular shape. The pipe connectors 13, 14 may e.g. be configured to extend vertically in the container during operation.

The fluid 24 enters the cavity 15 in one of the pipe connectors 13, 14 and is from there distributed and forced into the pipes of the pipe bundle 17 from the cavity 15 to provide a heat exchange between the pipes 17a-17n of the pipe layers and the first fluid 24 in the container's 11 cavity 11a. The fluid 24 then enters a cavity 15 in the other of the pipe connectors 13, 14 and is from there configured to be transported out of the container's 11 cavity 11a.

It is generally understood that the flow of the fluid 24 to force the fluid 24 into the pipes of the pipe bundle 17 may e.g. be provided by means of one or more pressure inducing devices such as pumps, as electric pumps (not illustrated).

One or more of the subgroups SG1, SG2 may on embodiments of the present disclosure include at least three pipes 17a-17n, e.g. at least five pipes such as at least eight pipes (17a-17n) arranged side by side such as in a plane P2 defined by the pipe layer 22.

One or more of the pipe layers 22, such as at least 30% or 40%, or even at least 60% or 70% of the pipe layers 22 of the pipe bundle 17 may include at least four flow paths such as at least six or eight flow paths, e.g. at least twelve flow paths such as at least eighteen flow paths arranged side by side substantially in a plane P2 defined by the respective pipe layer 22.

The total length of each flow path in the respective pipe layer 22 may in embodiments of the present disclosure vary less than 10%, such as less than 5%, e.g. less than 2%, and/or the total length of all flow paths in the pipe bundle 17 may vary less than 10%, such as less than 5%, e.g. less than 2%.

It is generally understood that the pipe layout as disclosed in relation to one or more embodiments of one or more of FIGS. 1-6 may be especially suitable for a pipe bundle in a heat exchanger 10 for an evaporation unit. However, in further embodiments of the present disclosure, the pipe layout may be used for a heat exchanger 10 for any other suitable purpose, for example for a super heater, a re-heater, an economizer, and/or the like.

FIG. 7 illustrates schematically a cross sectional view of an evaporator unit 110 according to embodiments of the present disclosure, including two heat exchangers 10 and a further steam container 111 in fluid communication with the heat exchangers 10 of the evaporator unit 110. The steam container 111 is preferably placed above the heat exchangers 10 and is configured to receive steam generated in the heat exchangers 10 by means of a [an] heat exchange between the fluid 25 in the pipes of the pipe bundles 17, and the fluid such as water and/or steam in the container's 11 cavity 11a, through the walls of the pipe bundle 17 pipes.

The evaporator unit 110 includes an inlet 112 for water/steam 24, which is guided through one or more pipes/downcomers 113 to the heat exchangers 110. The water is heated by a pipe bundle 17 in the respective heat exchanger 10 inside the containers 11 and the generated steam there from enters the steam container 111 through a riser arrangement/one or more riser pipes 114 providing a fluid connection for steam to the steam drum/steam container 111. The heat exchanger 10 container may be connected to the steam container 111 by at least four, such as at least five, e.g. at least eight such as at least twelve riser arrangements 114 such as riser pipes distributed along the length of the heat exchanger's container 11. These provides a fluid communication between the heat exchanger's cavity 11a and the interior of the steam container 111.

The steam in the steam drum/container 111, from the heat exchangers 10, enters in embodiments of the present disclosure a separation arrangement 115 such as one or more cyclones and/or chevrons for separating water drops/droplets from the steam. The water separated from the steam in this separation arrangement 115 leaves the separator arrangement 115 through an outlet/drain 115a and into the steam container 111 again, and the steam in the steam container 111 leaves the evaporator unit through the steam outlet 116. The steam may e.g. from here enter a super heater before it is used in e.g. a turbine (not illustrated in FIG. 7), or another suitable arrangement configured to either further remove water from the steam, or for using the steam from the outlet 116.

The heat exchangers 10 of the evaporator unit 110 may in embodiments of the present disclosure, as illustrated in FIG. 7, be horizontally arranged so that the heat exchangers longitudinal direction extends substantially horizontally. There are shown two heat exchangers 10 for the evaporator unit in FIG. 7 but this can also be one or more than two in further embodiments of the present disclosure.

In other embodiments of the present disclosure, (not illustrated), the evaporator unit/arrangement 110 may include one or more heat exchanger(s) 10 arranged vertically (so that the longitudinal direction of the container 11 extends vertically), and the steam container/drum may be arranged above/at a level over the vertically arranged heat exchangers, and connected to the heat exchanger by one or more riser pipes 114 for the steam generated by the heat exchanger.

As can be seen in FIG. 7, the pipe bundle 17 may provide a bundle having a substantially rectangular cross section, but in further embodiments, the pipe bundle may 17 may have a cross section adapted to the shape of the wall of the container, such as e.g. illustrated in FIG. 5. Also, baffle arrangements are omitted in FIG. 7, but may in further embodiments be installed in the container 11.

FIG. 8 illustrates schematically a part of a solar power plant 1 for generating electric power for the utility grid according to embodiments of the present disclosure. The solar power plant may be configured to generate e.g. between 10 MW and 1000 MW of electric power, such as between 25 MW and 800 MW of electric power such as above 50 or 100 MW dependent on the rated capacity of the solar power plant and/or the amount of energy in the sun light.

The solar power plant includes a heating system comprising a plurality of solar absorbers 2 controlled to keep reflecting sunlight toward a heating unit 101 arranged to be heated by the sun, so that the solar absorbers 2 compensates for the sun's apparent motions in the sky. The positioning of the solar absorbers is normally controlled by a software solution, which controls a drive mechanism 2a. Only one solar absorber is illustrated in order to improve simplicity of FIG. 8, but it is understood that the solar power plant may include e.g. between 20 and 2000000, solar absorbers, e.g. between 100 and 350000 solar absorbers and all directed to transmit the reflecting sunlight towards one or more heating units 101.

The heating system includes a heating unit 101 in FIG. 8 including a vessel, which contains a fluid such as molten salt or thermal oil, which is heated by the sunlight.

The heating unit 101 includes an outlet 101a to a pipe connection 102 guiding the thermal oil or molten salt 24 to a super heater 120 and a re-heater 130 respectively.

It is generally understood that in other embodiments of the present disclosure, the heating system may include a solar absorber solution, comprising a plurality of solar absorbers and where each solar absorber is arranged to heat (by means of sunlight) molten salt or thermal oil in a pipe or pipes running between the solar absorbers. In further embodiments of the present disclosure, the heating system may include a Fresnel reflector heating solution.

The system 1 includes:
a super heater 120,
one or more re-heaters 130, 131,
an economizer 150, and
an evaporator unit 110.

One or more of these (120, 130,131, 150, 110) preferably includes one or more heat exchangers 10 according to one or more embodiments described above in relation to one or more of FIGS. 1-7.

The thermal oil or molten salt received by the super heater 120 and re-heater 130 from the heating unit 101 may in embodiments of the present disclosure have a temperature between 200° C. and 750° C., such as between 300° C. and 650° C.

Super Heater

The super heater receives the molten salt or thermal oil from the heating unit 101 through an inlet 120*b*, and utilizes the molten salt or thermal oil for further heating steam received through a steam inlet 120*y* from the evaporator unit 110, by means of the heat exchanger 10 of the super heater 120 before the further heated/superheated steam is fed to a steam turbine (not illustrated in FIG. 1) through a steam outlet 120*x*. The thermal oil or molten salt leaving the heat exchanger 10 of the super heater 120 through the outlet 120*a* is fed to the heat exchanger(s) 10 of the evaporator unit 110.

The steam leaving the super heater 120 to the steam turbine through the outlet 120*x* may in embodiments of the present disclosure be at a pressure between 10 bar and 200 bar, such as between 25 bar and 180 bar, and has a temperature that is higher than the temperature of the steam received from the evaporator unit, e.g. at a temperature between 150° C. and 500° C., such as between 250° C. and 450° C.

First Re-Heater

The system also includes a re-heater arrangement including a first re-heater 130 receiving the thermal oil or molten salt from the heating unit 101 through an inlet 130*b*. The functionality of the re-heater 130 is to re-heat steam by the heat exchanger 10 of the re-heater 130 before it enters a low pressure section of the steam turbine.

The molten salt or thermal oil leaves the first re-heater 130 through an outlet 130*a*, and is fed to an inlet 110*b* of the heat exchanger(s) 10 of the evaporator unit 110.

The steam leaving the first re-heater before it re-enters the turbine at the low pressure part (see FIG. 1*a*) may, in embodiments of the present disclosure, be at a pressure of 10-50 bar and at a temperature between 150° C. and 750° C., such as between 350° C. and 650° C.

Evaporator Unit

The evaporator unit 110 is arranged to receive heated water and/or steam through an inlet 120*y*.

The heated water and/or steam is heated in the one or more heat exchangers 10 of the evaporator unit 110 to provide a phase transition of water into steam, and this steam leaves the evaporator unit through the steam outlet 110*x* and is guided to the inlet 120*y* of the super heater 120.

Embodiments of the evaporator unit 110 are described in more details later on e.g. in relation to FIG. 7.

The molten salt or thermal oil leaves the one or more heat exchangers 10 of the evaporator unit 110 through an outlet 110*a*, and is guided by a piping system to heat exchangers 10 of an economizer 150 and a second re-heater 131 respectively.

The molten salt or thermal oil 24 entering the evaporator unit 110 may in embodiments of the present disclosure be at/have a temperature between 250° C. and 550° C., such as between 350° C. and 500° C.

The steam leaving the evaporator unit 110 through the steam outlet 110*x* to the super heater may in embodiments of the present disclosure have a temperature between 180° C. and 400° C., such as between 250° C. and 350° C., preferably at a pressure between 12 bar and 200 bar, such as between 25 bar and 180 bar.

Second Re-Heater

The second re-heater 131 receives this molten salt or thermal oil from the evaporator unit 110 at inlet 131*b* and is used in the heat exchanger 10 of the second re-heater to heat steam received from the steam turbine through an inlet 131*y* before it is fed/guided through an outlet 131*x* to the an inlet 130*y* of the first re-heater 130, where the steam is further heated by the molten salt or thermal oil 24 received from the heating unit 101, before it re-enters the steam turbine 140 from the outlet 130*x* e.g. in embodiments of the present disclosure, at a pressure between 15 bar and 50 bar, such as between 20 bar and 30 bar, and having a temperature between 250° C. and 750° C., such as between 300° C. and 500° C.

The steam from the outlet 131*x* of the second re-heater 131 may in embodiments of the present disclosure be at a pressure between 10 bar and 35 bar, such as between 16 bar and 30 bar, and have a temperature lower than at the outlet 130*x* of the first re-heater 130, e.g. such as a temperature between 250° C. and 450° C., such as between 280° C. and 400° C.

The heat transferring fluid such as molten salt or thermal oil 24 leaves the heat exchanger 10 of the second re-heater 131 at the outlet 131*a* and is returned to an inlet 101*b* of the heating unit 101 to be heated by sunlight.

Economizer

The economizer 150 receives the molten salt or thermal oil at the inlet 150*b* from the outlet 110*a* of the heat exchanger 10 of the evaporator unit 110. This molten salt or thermal oil is utilized for heating water and/or steam received through inlet 150*y* from the steam turbine, before this water and/or steam leaves the heat exchanger 10 of the economizer 150 through outlet 150*x* and is fed/guided to the inlet 110*y* of the evaporator unit 110 to be evaporated as explained above.

The water/steam entering the economizer 150 may in embodiments of the present disclosure have a temperature of e.g. between 180° C. and 350° C., such as between 200° C. and 300° C., and be at a pressure between 12 bar and 200 bar, such as around 16-185 bar. When the heat transferring fluid molten salt or thermal oil 24 leaves the heat exchanger 10 of the economizer 150 at the outlet 150*a*, it is returned to an inlet 101*b* of the heating unit 101 to be heated by sunlight.

FIG. 8*a* illustrates schematically embodiments of the present disclosure relating to the operation of a steam turbine 140, which is driven by steam generated by means of e.g. one or more heat exchangers 10, such as one or more heat exchangers 10 of the system of FIG. 8. The circuitry for the molten salt or thermal oil is not illustrated in FIG. 8*a* in order to improve the simplicity of the drawing.

The steam turbine arrangement is connected to a generator G configured to generate and deliver electric power EP to the utility grid UG. The steam generator 140 may e.g. receive the steam from the super heater 120 (see FIG. 8) through an inlet arrangement 140*y*1 to a high pressure part 141 of the steam turbine arrangement 140.

The steam is reduced in pressure and temperature in the steam turbine arrangement 140 at a high-pressure part 141. For example, in embodiments of the present disclosure, the high pressure part 141 may reduce the steam from a pressure e.g. between 95 bar and 130 bar, such as between 100 bar and 115 bar at a temperature between 300° C. and 450° C., such as between 350° C. and 400° C., and to a pressure of e.g. 15 bar to 25 bar such as between 18-22 bar at a temperature between 150° C. and 250° C., such as between 190° C. and 220° C.

The steam then enters the second re-heater 130 from outlet 140x1, and subsequently the first re-heater 130, before it is reintroduced through an inlet 140y2a to a low pressure part 142 of the steam turbine arrangement 140, to provide further energy to the steam turbine.

Then the steam leaves the low pressure part through outlet 140x2 and enters a condensing unit, which condenses the steam, and the water from the condensing unit 160 then enters a pump 170 which pressurizes the water before the water enter the economizer 150 again.

It is generally to be understood that the steam may be condensed by the condensing unit and be water in liquid state from at least the condenser, through the economizer and to the evaporator. From the evaporator, the fluid to drive the steam turbine may be in steam form, through the super heater, the steam turbine and the re-heaters.

It is generally understood that one or more heat exchangers 10 of the system 1 disclosed in relation to FIGS. 8 and 8a may be heat exchangers 10 according to various embodiments of the present disclosure described in relation to one or more of FIGS. 1-7.

It is generally understood that the layout of the pipes of inside the various heat exchanger setups 110, 120, 130, 101, 150 of the solar power plant 1 may be different in the different heat exchangers. For example the layout of the pipes of the pipe bundle as disclosed in relation to one or more of FIGS. 1-7 may be used for an evaporator unit 110. However, another second pipe layout of the pipe bundle 17 may be more suitable for the other heat exchangers 10 used in the super heater, re-heater and/or the economizer. Such a second pipe layout may e.g. include a pipe bundle with layers of pipes, but where pipes of the pipe bundle are arranged next to each other and extend together between the pipe connectors in a meandering manner providing a plurality of crests on the pipes between the pipe connectors, and so that crests of pipes of the pipe bundle are arranged to extend into recesses provided by one or more crests on other pipes of the pipe bundle. These crests in the second layout may extend in a direction transverse to the longitudinal direction of the container.

FIG. 9 illustrates schematically a part of a pipe bundle 17 in a heat exchanger according to embodiments of the present disclosure. In one or more embodiments of the present disclosure, the horizontal pitch HPI (see between two neighbouring pipes 17a, 17b in the same pipe layer 22 may be above 1.1×D, such as above 1.2×D, where D is the outer pipe diameter. For example, this horizontal pitch HPI may be between 1.2 and 4 times the pipe diameter. In one or more embodiments of the present disclosure, the pitch HPI in each of the layers 22 between neighbouring pipes may be no more than 3.5×D such as no more than 3×D. As also can be seen from FIG. 9, the pipes of two neighbouring layers arranged next to each other (above/below) may be arranged staggered.

In general, it is to be understood that even though the above mentioned heat exchanger solution described in relation to FIGS. 1-7, may be used in heat exchanger systems such as concentrated solar power plants as e.g. described in relation to one or more embodiments of FIGS. 8-8a, it may also be used in other types of industrial applications. For example, the heat transferring fluid may be heated by excess power, such as excess heat or excess electrical power, it may be heated by means of power provided by means other types of renewable energy sources such as wind energy, wave energy, hydropower (where e.g. water stored in an elevated position or is naturally flowing due to gravity, and is guided to flow through a turbine when there is a desire for electric power), it may be heated by means of biomass or any other suitable type of power source.

It is moreover understood that the system in which the heat exchanger is to be used may not necessarily generate electrical power by means of a turbine as described in relation to FIG. 8a. It may also be used for other industrial process heating applications such as in production factories/facilities needing heating in an industrial scale for example food processing or for any other type of heating, it may be used in heating systems for larger greenhouse facilities where a heating by means of a heating system is used beyond the heating provided by the sun through the window panes of the green houses, it may be used in district heating systems for generating heat to be distributed in the district heating system to households and/or businesses and/or the like. The output from the heat exchanger, such as steam, may in embodiments of the present disclosure also be used for generating a combination of heat to be used in industrial heating applications, and electric power.

It is naturally to be understood that dependent on the application of the heat exchanger, the above mentioned examples of the pressure in the container of the heat exchanger and/or the temperature of the first and/or second fluids 24, 25 may vary and be adapted to the relevant use and system in which the heat exchanger 10 is to be installed.

In general, it is to be understood that the present disclosure is not limited to the particular examples described above but may be adapted in a multitude of varieties within the scope of the present disclosure as specified in e.g. the claims. Accordingly, for example, one or more of the described and/or illustrated embodiments above may be combined to provide further embodiments of the present disclosure.

The invention claimed is:

1. A heat exchanger for providing heat exchange between fluids, wherein said heat exchanger comprises:
   a container configured to house a first fluid;
   a first pipe connector and a second pipe connector, each of the first pipe connector and the second pipe connector comprising:
      a cavity; and
      a plurality of pipe connection points; and
   a pipe bundle arranged inside the container and extending between the first pipe connector and the second pipe connector, wherein pipes of the pipe bundle are configured to guide a second fluid, wherein the pipe bundle in the container is connected to the first pipe connector at the pipe connection points of the first pipe connector and the second pipe connector at the pipe connection points of the second pipe connector points so that insides of the pipes of the pipe bundle are in fluid communication with the cavity of the first pipe connector and the cavity of the second pipe connector and thereby provides flow paths configured to guide the second fluid between the first pipe connector and the second pipe connector;
   wherein the heat exchanger is configured to provide a heat transfer between the first fluid and the second fluid through pipe walls of the pipes of the pipe bundle;
   wherein the pipes of the pipe bundle are distributed in layers of the pipes;
   wherein a plurality of pipes of each of the layers of pipes each comprises a first bend and a second bend, where each of said first bend and said second bend is provided between a first flow path section, a second flow path section and a third flow path section of the respective pipe which extend in a longitudinal direction of the container, so that the respective pipe provides three substantially parallel flow path sections;

wherein the first flow path section has a length that is at least 1.7 times greater than a length of the second flow path section and the third flow path section;

wherein the first bend is provided between the first flow path section and the second flow path section, and wherein the second bend is provided between the second flow path section and the third flow path section;

wherein each of the layers of pipes comprises a first pipe subgroup and a second pipe subgroup, wherein the first flow path section of the first pipe subgroup is connected to one of the first pipe connector and the second pipe connector, and wherein the first flow path section of the second pipe subgroup is connected to the other one of the first pipe connector and the second pipe connector;

wherein the second bend between the second flow path section and the third flow path section of the respective pipes in one of the first pipe subgroup and the second pipe subgroup in one of the pipe layers is arranged opposite to the second bend extending between the second flow path section and the third flow path section of the respective pipes in the other one of the first pipe subgroup and the second pipe subgroup of one of the pipe layers.

2. The heat exchanger according to claim 1, wherein a part of the first flow path section of the respective pipe extends in the longitudinal direction of the container next to a part of the second flow path section and the third flow path section of the respective pipe.

3. The heat exchanger according to claim 1, wherein the first flow path section of the respective pipe extends in the longitudinal direction of the container next to and parallel to the second flow path section and third flow path section of both the first pipe subgroup and the second pipe subgroup.

4. The heat exchanger according to claim 1, wherein the second flow path section and the third flow path section of the first pipe subgroup and the second pipe subgroup are arranged between and parallel to the first flow path section of the first pipe subgroup and the second pipe subgroup.

5. The heat exchanger according to claim 1, wherein each of a plurality of the layers of pipes comprises the first pipe subgroup and the second pipe subgroup, and wherein the second flow path section and the third said two shorter flow path section of the respective pipes in the first pipe subgroup in one of the layers of pipe are arranged in continuation of the second flow path section and the third flow path section of pipes in the second pipe subgroup of the one of the layers of pipe layer.

6. The heat exchanger according to claim 1, wherein each of the first pipe subgroup and the second pipe subgroup comprises a plurality of pipes arranged next to each other so that crests of one or more of the plurality of pipes at the first bend and the second bend of the respective first pipe subgroup and the second pipe subgroup extend into troughs of the first bend and the second bend of one or more other pipes of the same respective first pipe subgroup and the second pipe subgroup.

7. The heat exchanger according to claim 1, wherein a first number of flow paths in the first pipe subgroup and a second number of flow paths in the second pipe subgroup are equal and/or the same.

8. The heat exchanger according to claim 1, wherein the first pipe subgroup comprises two pipes arranged side-by-side.

9. The heat exchanger according to claim 1, wherein a first number of first flow path sections and a second number of second flow path sections in each of the layers of pipe, counted in a cross sectional plane perpendicular to the longitudinal direction of the container extending through each of layers of is the same.

10. The heat exchanger according to claim 1, wherein pipes of each of the first pipe subgroup and the second pipe subgroup provide a broader subgroup section and a narrower subgroup section, thereby providing a space next to the narrower subgroup section; and wherein the broader subgroup section of the first pipe subgroup extends into the space next to the narrower subgroup section of the second pipe subgroup.

11. The heat exchanger according to claim 1, wherein one of the layers of pipes comprises four flow paths arranged side-by-side.

12. The heat exchanger according to claim 1, wherein lengths of the paths in a respective one of the layers of pipe layer vary from one another by less than 10% and/or wherein lengths of said flow paths in said pipe bundle vary from one another by less than 10%.

13. The heat exchanger according to claim 1, wherein one of the first fluid and the second fluid is molten salt or thermal oil, and/or wherein the other of the first fluid and the second fluid fluids is water and/or steam.

14. The heat exchanger according to claim 1, wherein the heat exchanger is part of an evaporator unit and is configured to generate steam from the first fluid by providing a phase transition of the first fluid via the second fluid.

15. The heat exchanger according to claim 14, wherein the evaporator unit comprises a steam container.

16. The heat exchanger according to claim 15, wherein the evaporator unit comprises:
an inlet for a fluid; and
a riser arrangement configured so that the fluid supplied to the evaporator unit and evaporated in the heat exchanger is circulated to the steam container through the riser arrangement; and
wherein the steam container comprises a steam outlet for evaporated fluid.

17. The exchanger according to claim 16, wherein the steam container comprises a separation for separating the liquid from the evaporated liquid received from the heat exchanger before the evaporated liquid enters the steam outlet.

18. The heat exchanger according to claim 15, wherein the steam container is in fluid communication with the heat exchanger so as to supply water to the heat exchanger.

19. The heat exchanger according to claim 1, wherein the layers of the pipes are of different width in a direction transverse to the longitudinal direction of the container and wherein there are fewer of the layers of pipes with of smaller width than the layers of pipes with larger width, so that the width of the layers of pipes are adapted to a cross-sectional shape of the container.

20. The heat exchanger according to claim 1, wherein the three parallel flow path sections are straight, flow path sections arranged side-by-side in a common layer of the layers of pipes.

21. The heat exchanger according to claim 1, wherein the first pipe connector and the second pipe connector are each tubular-shaped and extend into a cavity of the container.

22. An evaporator unit comprising:

a heat exchanger comprising:
  a container configured to house a first fluid;
  a first pipe connector and a second pipe connector, each of the first pipe connector and the second pipe connector comprising:
    a cavity; and
    a plurality of pipe connection points; and
  a pipe bundle arranged inside the container and extending between the first pipe connector and the second pipe connector, wherein pipes of the pipe bundle are configured to guide a second fluid, wherein the pipe bundle in the container is connected to the first pipe connector at the pipe connection points of the first pipe connector and the second pipe connector at the pipe connection points of the second pipe connector so that insides of the pipes of the pipe bundle are in fluid communication with the cavity of the first pipe connector and the cavity of the second pipe connector and thereby provides flow paths configured to guide the second fluid between the first pipe connector and the second pipe connector;
  wherein the heat exchanger is configured to provide a heat transfer between the first fluid and the second fluid through pipe walls of the pipes of the pipe bundle;
  wherein the pipes of the pipe bundle are distributed in layers of the pipes;
  wherein a plurality of pipes of each of the layers of pipes each comprises a first bend and a second bend, where each of said first bend and said second bend is provided between a first flow path section, a second flow path section and a third flow path section of the respective pipe which extend in a longitudinal direction of the container, so that the respective pipe provides three substantially parallel flow path sections;
  wherein the first flow path section has a length-that is at least 1.7 times greater than a length of the second flow path section and the third flow path section;
  wherein the first bend is provided between the first-flow path section and the second flow path section, and wherein the second bend is provided between the second flow path section and the third flow path section;
  wherein each of the layers of pipes comprises a first pipe subgroup and a second pipe subgroup, wherein the first flow path section of the first pipe subgroup is connected to one of the first pipe connector and the second pipe connector, and wherein the first flow path section of the second pipe subgroup is connected to the other one of the first pipe connector and the second pipe connector;
  wherein the second bend between the second flow path section and the third flow path section of the respective pipes in one of the first pipe subgroup and the second pipe subgroup in one of the pipe layers is arranged opposite to the second bend extending between the second flow path section and the third flow path section of the respective pipes in the other one of the first pipe subgroup and the second pipe subgroup of one of the pipe layers;
a steam container;
an inlet for a fluid;
a riser arrangement configured so that steam supplied to the evaporator unit and evaporated in the heat exchanger is configured to be circulated to the steam container; and
a steam outlet for the evaporated steam.

23. A solar power plant comprising:
a solar absorber; and
a heat exchanger comprising:
  a container configured to house a first fluid;
  a first pipe connector and a second pipe connector, each of the first pipe connector and the second pipe connector comprising:
    a cavity; and
    a plurality of pipe connection points; and
  a pipe bundle arranged inside the container and extending between the first pipe connector and the second pipe connector, wherein pipes of the pipe bundle are configured to guide a second fluid, wherein the pipe bundle in the container is connected to the first pipe connector at the pipe connection points of the first pipe connector and the second pipe connector at the pipe connection points of the second pipe connector so that insides of the pipes of the pipe bundle are in fluid communication with the cavity of the first pipe connector and the cavity of the second pipe connector and thereby provides flow paths configured to guide the second fluid between the first pipe connector and the second pipe connector;
  wherein the heat exchanger is configured to provide a heat transfer between the first fluid and the second fluid through pipe walls of the pipes of the pipe bundle;
  wherein the pipes of the pipe bundle are distributed in layers of the pipes;
  wherein a plurality of pipes of each of the layers of pipes each comprises a first bend and a second bend, where each of said first bend and said second bend is provided between a first flow path section, a second flow path section and a third flow path section of the respective pipe which extend in a longitudinal direction of the container, so that the respective pipe provides three substantially parallel flow path sections;
  wherein the first flow path section has a length-that is at least 1.7 times greater than a length of the second flow path section and the third flow path section;
  wherein the first bend is provided between the first-flow path section and the second flow path section, and wherein the second bend is provided between the second flow path section and the third flow path section;
  wherein each of the layers of pipes comprises a first pipe subgroup and a second pipe subgroup, wherein the first flow path section of the first pipe subgroup is connected to one of the first pipe connector and the second pipe connector, and wherein the first flow path section of the second pipe subgroup is connected to the other one of the first pipe connector and the second pipe connector;
  wherein the second bend between the second flow path section and the third flow path section of the respective pipes in one of the first pipe subgroup and the second pipe subgroup in one of the pipe layers is arranged opposite to the second bend extending between the second flow path section and the third flow path section of the respective pipes in the other one of the first pipe subgroup and the second pipe subgroup of one of the pipe layers.

24. The solar power plant according to claim 23, wherein heat exchanger is arranged in an evaporator unit of the solar power plant.

25. The solar power plant according to claim 23, wherein the heat exchanger is configured to provide a super heater, a re-heater and/or an economizer of the solar power plant.

\* \* \* \* \*